United States Patent
Lu et al.

(10) Patent No.: US 7,085,016 B2
(45) Date of Patent: Aug. 1, 2006

(54) METHOD AND APPARATUS FOR DITHERING AND INVERSELY DITHERING IN IMAGE PROCESSING AND COMPUTER GRAPHICS

(75) Inventors: Chung-Yen Lu, Taipei (TW); Ruen-rone Lee, Hsin Chu (TW)

(73) Assignee: Silicon Integrated Systems Corp. (TW)

( * ) Notice: Subject to any disclaimer, the term of this patent is extended or adjusted under 35 U.S.C. 154(b) by 1057 days.

(21) Appl. No.: 09/912,810

(22) Filed: Jul. 24, 2001

(65) Prior Publication Data

US 2002/0089701 A1 Jul. 11, 2002

(30) Foreign Application Priority Data

Nov. 21, 2000 (TW) .............................. 89124719 A

(51) Int. Cl.
*H04N 1/405* (2006.01)
(52) U.S. Cl. .................... 358/3.13; 358/3.16; 358/3.01
(58) Field of Classification Search ............... 358/3.13, 358/3.14, 3.16, 3.19, 535, 536, 2.99, 3.01, 358/3.06, 3.08
See application file for complete search history.

(56) References Cited

U.S. PATENT DOCUMENTS

| | | | |
|---|---|---|---|
| 4,758,897 A * | 7/1988 | Hiratsuka et al. | 358/3.08 |
| 4,920,501 A * | 4/1990 | Sullivan et al. | 358/3.19 |
| 5,027,078 A * | 6/1991 | Fan | 358/3.08 |
| 5,268,771 A * | 12/1993 | Murakami et al. | 358/448 |
| 5,333,064 A * | 7/1994 | Seidner et al. | 358/3.08 |
| 5,339,170 A * | 8/1994 | Fan | 358/3.08 |
| 5,506,699 A * | 4/1996 | Wong | 358/3.08 |
| 5,822,451 A * | 10/1998 | Spaulding et al. | 382/162 |
| 6,222,945 B1 * | 4/2001 | Cheung et al. | 382/260 |

* cited by examiner

*Primary Examiner*—Thomas D. Lee
(74) *Attorney, Agent, or Firm*—Martine Penilla & Gencarella, LLP

(57) ABSTRACT

The invention provides a method and an apparatus for dithering, and inversely dithering an image. The apparatus makes use of a pixel address and a pixel data to locate a dither reference value from a dither matrix and use the dither reference value to convert an original pixel data having N bits into a dithered pixel data having M bits (N>M). On the other hand, the apparatus for performing an inversely dithering process makes use of the pixel address and the dithered pixel data (M bits) to locate a dither reference value from a dither matrix. Then, the dither reference value is employed to perform an inversely dithering process to recover the dithered pixel data into original pixel data.

8 Claims, 5 Drawing Sheets

METHOD AND APPARATUS FOR DITHERING AND INVERSELY DITHERING IN IMAGE PROCESSING AND COMPUTER GRAPHICS

BACKGROUND OF THE INVENTION

A. Field of the Invention

The invention relates generally to computer graphics and image processing, and more particularly to methods and apparatus for processing input gray level values with dither matrices to generate output color representative of an output image.

B. Description of the Related Art

Dithering is a graphics technology for selecting an approximate color from a mixture of other colors by a computer program when a screen is unable to display the color required by the image. That is, pixel data having high bits (N bits) are converted to pixel data having low bits (M bits).

FIG. 1 is a block diagram showing a conventional apparatus for performing a dithering process. As shown in FIG. 1, a dither value generator 101 generates a dither reference value to a dithering unit 102 in response to a pixel address. Then, an original pixel color value (N bits) is input to the dithering unit 102 for generating a dithered value (M bits) by performing a dithering process in response to the dither reference value.

FIG. 2 is a block diagram showing a conventional apparatus for performing an inversely dithering process. As shown in FIG. 2, the dither value generator 201 generates a dither reference value in response to the pixel address. The dithered value (M bits) of the pixel is input to the inversely dithering unit 202, which generates a recovered value (N bits) by performing an inversely dithering process in response to the dither reference value.

However, the dithering process will result in "fixed pattern effect" because the dither value generator 201 of the prior art can select a dither reference value from a dither matrix $D_n$ merely based on a pixel address. For example, for a pixel that is located at (x, y) on the screen and has a color value of I ("pixel data" hereinafter), the corresponding row and column of the pixel's dither reference value are calculated as:

i=(x modulo n)

j=(y modulo n).

The dither reference values are selected from a dither matrix in accordance with the values of (i, j). By comparing the pixel color value I with the dither reference value $D_n(i, j)$, a value I' can be defined in accordance with the following formulas. The highest M bits of the value I' is used to represent the dithered value of the pixel data.

I'=I−(I modulo $2^{N-M}$), if I<$D_n$(i, j); or

I'=I−(I modulo $2^{N-M}$)+$2^{N-M}$, if I>$D_n$ (i, j).

Since the image generates a "fixed pattern effect" frequently after the dither matrix $D_n$ is used to perform dithering process a number of times, even though a relatively large dither matrix is employed, the "fixed pattern effect" can only be alleviated without being resolved completely.

Moreover, since the least significant bits (LSB) of the color value are abandoned in the conventional dithering techniques, a random value must be used to perform the inversely dithering process. Therefore, after performing dithering process a number of times, it may result in a significant "color deviation effect".

SUMMARY OF THE INVENTION

In view of the above-mentioned problems, the main object of the invention is to provide a method and an apparatus to perform a dithering process such that even if dithering process and inversely dithering process have been performed a number of times, no "color deviation effect" occurs. In addition, the probability of "fixed pattern effect" during the computer graphic and image processing can be reduced.

One aspect of the invention is to provide a method and an apparatus to select a dither reference value from a dither array by use of a pixel address and a pixel data, which dither reference value is used as a basis for performing a dithering process.

Another aspect of the invention is to provide a method and an apparatus to perform an inversely dithering process by use of a pixel address and a pixel data to recover a dithered pixel data (M bits) to original pixel data with N bits (N>M).

To obtain the above-mentioned objects, the invention provides a method and an apparatus for dithering, and inversely dithering an image. The apparatus makes use of a pixel address and a pixel data to locate a dither reference value from a dither matrix and use the dither reference value to convert an original pixel data having N bits into a dithered pixel data having M bits (N>M). On the other hand, the apparatus for performing an inversely dithering process makes use of the pixel address and the dithered pixel data (M bits) to locate a dither reference value from a dither matrix. Then, the dither reference value is employed to perform an inversely dithering process to recover the dithered pixel data into original pixel data.

DETAILED DESCRIPTION OF THE PREFERRED EMBODIMENTS

Figure 1:
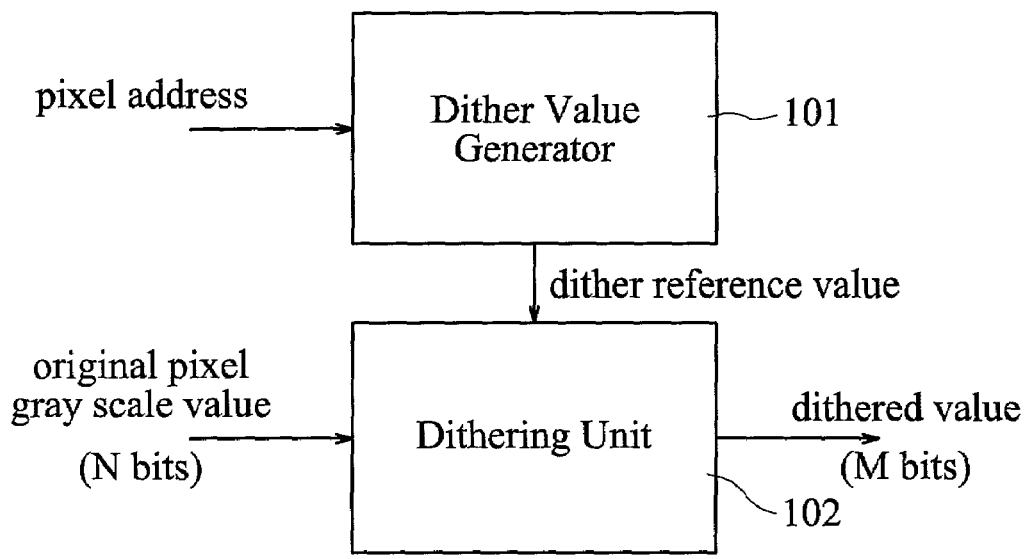
FIG. 1 is a block diagram showing a conventional apparatus for performing a dithering process.
Figure 2:
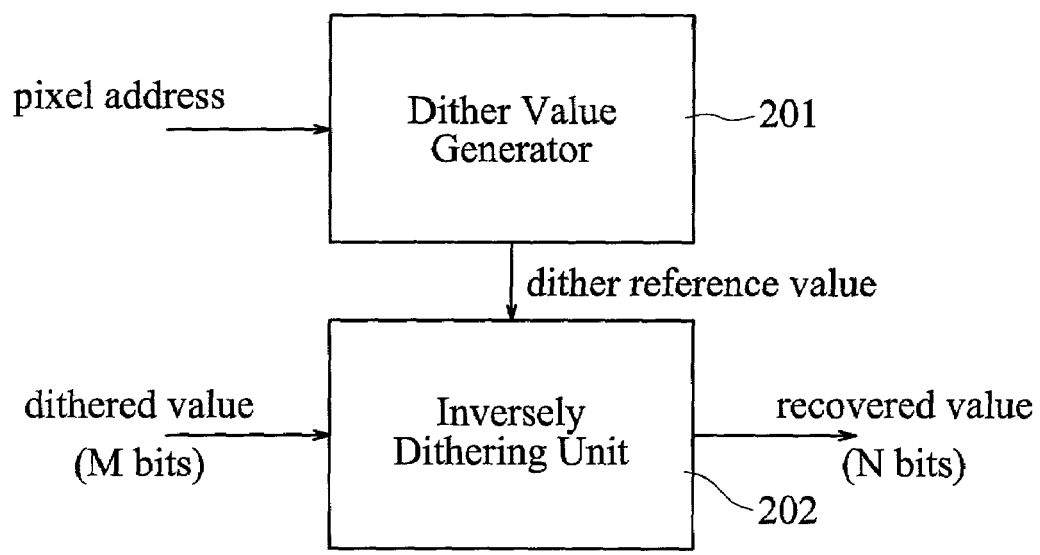
FIG. 2 is a block diagram showing a conventional apparatus for performing an inversely dithering process.
Figure 3:
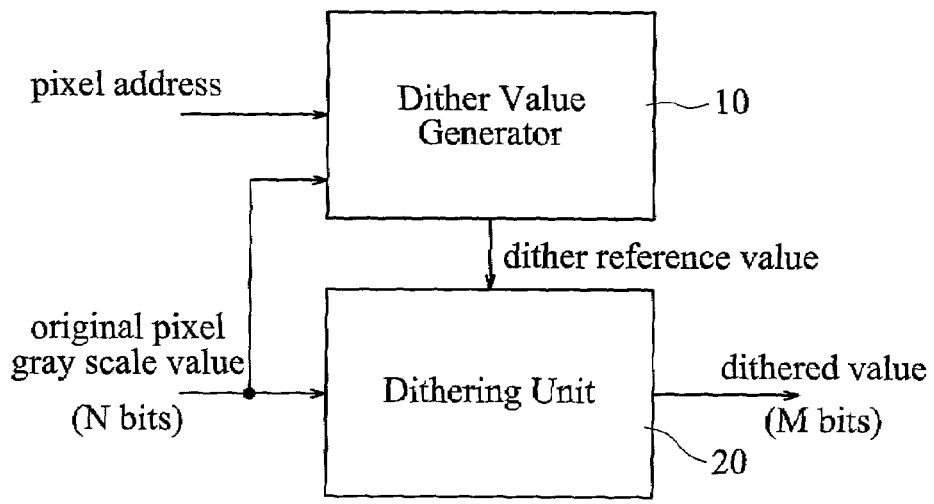
FIG. 3 is a block diagram showing an apparatus for performing a dithering process in accordance with the invention.

Shown in FIG. 3 is a block diagram showing an apparatus for performing a dithering process in accordance with the invention. As shown in FIG. 3, the dithering process of the invention includes a dither value generator 10 and a dithering unit 20. The dither value generator 10 receives a pixel address and a pixel data (N bits). The dither value generator 10 then generates a dither reference value by selecting from a dither array in response to the pixel address and the pixel data (N bits). The dithering unit 20 converts the N bits pixel data into an M-bits pixel data in response to the dither reference value.

Figure 4:
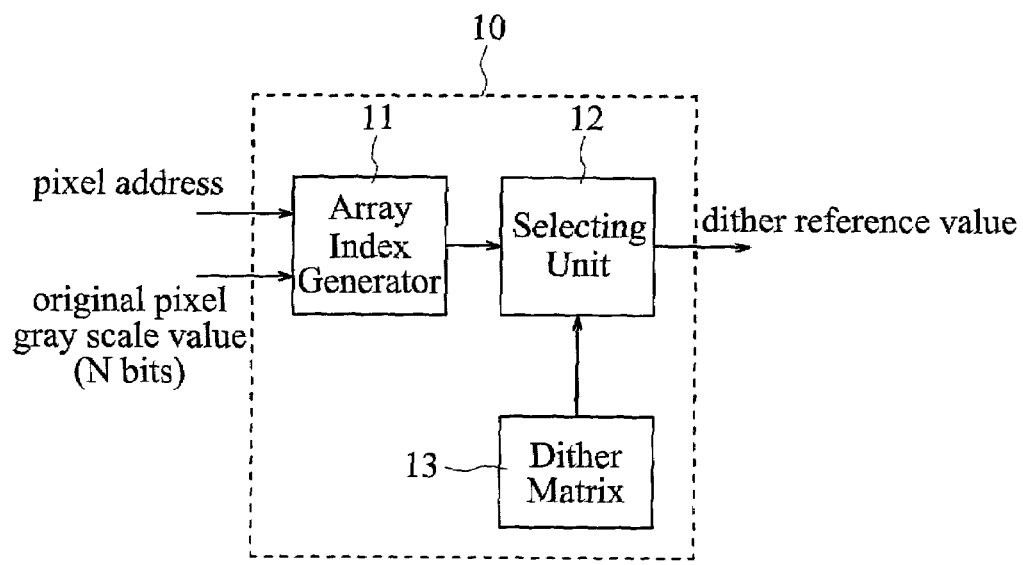
FIG. 4 is a detailed block diagram of the dither value generator 10 of FIG. 3.

FIG. 4 shows a detailed block diagram of the above-mentioned dither value generator 10. As shown in FIG. 4, the dither value generator 10 includes an array index generator 11, a selecting unit 12, and a dither matrix 13. The array index generator 11 outputs an array index (i, j) in response to the pixel address and the pixel data received. The selecting unit 12 selects a corresponding dither reference value from the dither matrix 13 in response to the array index (i, j) coming from the array index generator 11. The dither matrix 13 has dimensions of n×n. For example, a commonly used array for a 4×4 dither matrix is:

$$D_4 = \begin{bmatrix} 15 & 7 & 13 & 5 \\ 3 & 11 & 1 & 9 \\ 12 & 4 & 14 & 6 \\ 0 & 8 & 2 & 10 \end{bmatrix}$$

A pixel address includes coordinates of x and y, and is denoted by (x, y). In one embodiment of the invention, the array index generator 11 outputs an array index (i, j) in response to the pixel address (x, y) and the pixel data received as follows:
i=(x+C) modulo n
j=(y+C) modulo n
wherein C denotes the red, green or blue color values of the pixel to be dithered, n represents the dimension of the dither matrix, and modulo is a mathematical function which finds the remainder of a division. Note that the aforementioned C can be partial bits of a specific color. Based on the array index (i, j) obtained as stated above, the selecting unit 12 selects a dither reference value from the corresponding location of the dither matrix 13. For example, if the index (i, j) obtained is (2, 1), the corresponding dither reference value in the above-mentioned matrix $D_4$ is 7.

Figure 5:
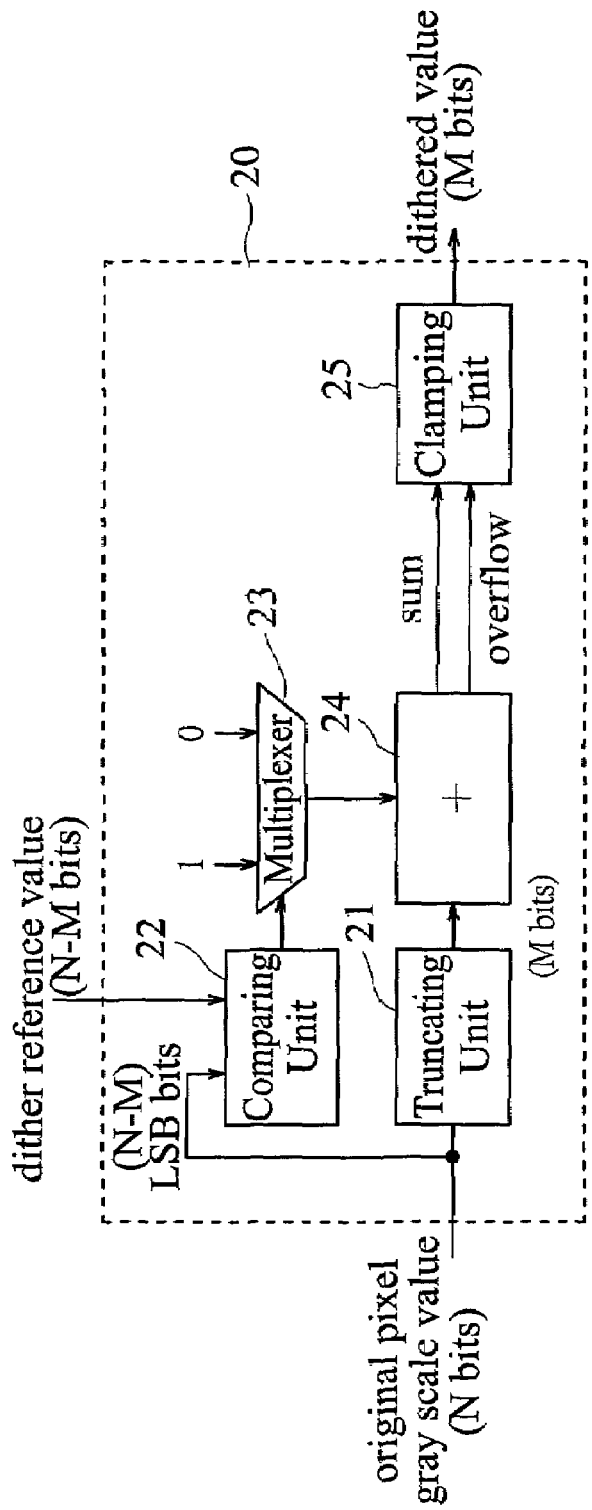
FIG. 5 is a detailed block diagram of the dithering unit 20 of FIG. 3.

FIG. 5 is a detailed block diagram showing the dithering unit 20 of FIG. 3. The dithering unit 20 includes: a truncating unit 21, a comparing unit 22, a multiplexer 23, an adder 24 and a clamping unit 25.

The truncating unit 21 receives the original pixel data (N bits), cuts down the (N−M) least significant bits thereof to generate M-bits pixel data as its output. The comparing unit 22 compares the dither reference value generated by the dither value generator 10 with the (N−M) least significant bits of the N bits pixel data and outputs a comparison signal to the multiplexer 23. The multiplexer 23 outputs a value of "0" or "1" to the adder 24 in response to the output comparison signal of the comparing unit 22. The adder 24 adds the output signal received from the multiplexer 23 to the M bits data received from the truncating unit 21, and outputs a "sum" signal and an "overflow" signal. After this, the clamping unit 25 performs a clamping process or not in response to the "overflow" signal received from the adder 24. If the "overflow" signal is "1", the clamping unit 25 outputs M bits of "1" as the dither reference value for an M bits dithered value. On the other hand, if the "overflow" signal is "0", the clamping unit outputs the "sum" signal received from the adder 24 as the dither reference value for an M bits dithered value.

Figure 6:
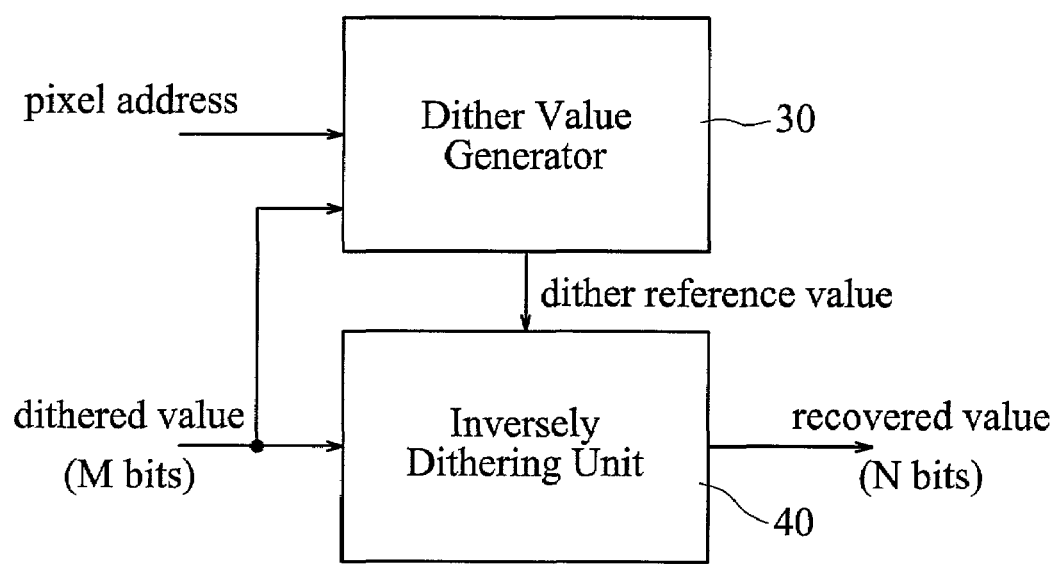
FIG. 6 is a block diagram showing an apparatus for performing an inversely dithering process in accordance with the invention.

FIG. 6 is a block diagram showing an apparatus for performing an inversely dithering process in accordance with the invention. The apparatus is to recover a dithered pixel data having M bits to original pixel data having N bits (N>M). As shown in FIG. 6, the inversely dithering apparatus includes a dither value generator 30 and an inversely dithering unit 40. The dither value generator 30 selects a dither reference value from a dither matrix in response to the pixel address and the pixel data (a dithered value) received. The dither value generator 30 is similar to the dither value generator 10 of FIG. 3 and therefore will not be discussed again in details. Contrary to the dithering unit 20, the inversely dithering unit 40 is to recover a dithered pixel data having M bits to original pixel data having N bits (N>M).

Figure 7:
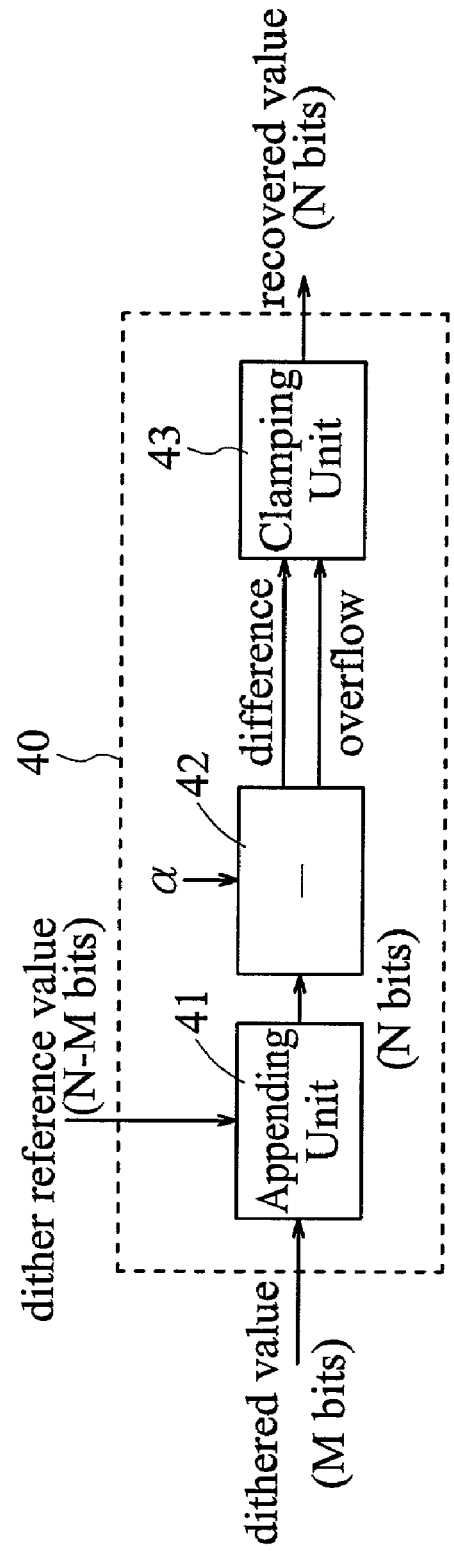
FIG. 7 is a detailed block diagram of the inversely dithering unit 40 of FIG. 6.

As shown in FIG. 7, the inversely dithering unit 40 includes an appending unit 41, a subtracting unit 42 and a clamping unit 43. Firstly, the appending unit 41 appends a (N−M) bits dither reference value to the end of the received dithered value (M bits) to generate an N-bits pixel data. The subtracting unit 42 subtracts a constant a from the output N-bits pixel data of the appending unit 41 and outputs a "difference" signal and an "overflow" signal to the clamping unit 43. The commonly used value of α is $2^{(N-M)}/2$. The clamping unit 43 performs a clamping process on the "difference" signal and outputs an N bits pixel data in response to the "overflow" signal received from the subtracting unit 42. Specifically, if the "overflow" signal is "1", the clamping unit 43 generates N bits of "0" as recovered value. On the other hand, if the "overflow" signal is "0", the clamping unit 43 generates the received "difference" signal as recovered value.

The dithering and inversely dithering processes in accordance with the invention are to avoid the Mach banding effect and the color deviation effect so as to minimize the perceivable intensity variations in the output image. Moreover, the dithering technique in accordance with the invention can determine the entry of a dither matrix by both a pixel address and a pixel data. Consequently, the invention not only provides relatively nice dithered result, but also provides relatively nice recovered pixel data to avoid color deviation effect.

While the invention has been shown and described with reference to a preferred embodiment thereof, and in terms of the illustrative drawings and algorithmic tables, it should not be considered as limited thereby. Various possible modifications, omissions, and alterations could be conceived of by one skilled in the art to the form and the content of any particular embodiment, without departing from the scope of the invention.

What is claimed is:

1. An apparatus for dithering pixel data, comprising:
   a dither value generator for outputting a dither reference value in response to an N-bits pixel data and a pixel address (x,y) thereof, wherein the dither value generator includes:
   a dither matrix; and
   an array index generator for generating an array index (i, j) in response to the N-bits pixel data and the pixel address (x,y) as follows: i=(x+C) modulo n; j=(y+C) modulo n, wherein C denotes the red, green or blue color value of the pixel to be dithered and n represents the dimension of the dither matrix; and
   a dithering unit for generating an M-bits pixel data in response to the dither reference value and the N-bits pixel data;
   wherein the value N is greater than the value M.

2. The apparatus of claim 1, wherein said dither value generator further comprises:
   a selecting unit for selecting the dither reference value from said dither matrix in response to the array index (i, j) generated by said array index generator.

3. The apparatus of claim 1, wherein said dithering unit comprises:

a truncating unit for generating the M-bits pixel data by truncating the (N–M) least significant bits of the N-bits pixel data;

a comparing unit for outputting a comparison signal by comparing the (N–M) least significant bits of the N-bits pixel data with the dither reference value;

an adder for adding the M-bits pixel data to the comparison signal, and outputting a "sum" signal and an "overflow" signal; and a clamping unit for performing a clamping process on the "sum" signal in response to the "overflow" signal, and outputting the M-bits pixel data.

4. An apparatus for inversely dithering pixel data comprising:

a dither value generator for generating a (N–M) bits dither reference value in response to a dithered M-bits pixel data and a pixel address (x, y); and an inversely dithering unit for converting the dithered M-bits pixel data to original N-bits pixel data in response to the dither reference value and the dithered M-bits pixel data, wherein the value N is greater than the value M.

5. The apparatus of claim 4, wherein said dither value generator comprises:

a dither matrix;

an array index generator for generating an array index (i, j) in response to the dithered M-bits pixel data and the pixel address (x, y) as follows: I=(x+C) modulo n; j=(y+C) modulo n, wherein C denotes the red, green or blue color value of the pixel to be inversely dithered and n represents the dimension of the dither matrix; and a selecting unit for selecting a dither reference value from said dither matrix in response to the array index (i, j) generated by said array index generator.

6. The apparatus of claim 4, wherein said inversely dithering unit comprises:

an appending unit for appending the (N–M) bits dither reference value to the dithered M-bits pixel data and generating an N-bits pixel data;

a subtracting unit for subtracting a constant value α from the output N-bits pixel data of said appending unit and outputting a "difference" signal and an "overflow" signal; and a clamping unit for performing a clamping process on the "difference" signal in response to the "overflow" signal, and outputting the N-bits pixel data.

7. The apparatus of claim 6, wherein the value of α is $2^{(N-M)}/2$.

8. An apparatus for dithering pixel data, comprising:

a dither value generator for outputting a dither reference value in response to an N-bits pixel data and a pixel address (x, y) thereof; and a dithering unit for generating an M-bits pixel data in response to the dither reference value and the N-bits pixel data, wherein said dithering unit comprises:

a truncating unit for generating the M-bits pixel data by truncating the (N–M) least significant bits of the N-bits pixel data;

a comparing unit for outputting a comparison signal by comparing the (N–M) least significant bits of the N-bits pixel data with the dither reference value;

an adder for adding the M-bits pixel data to the comparison signal, and outputting a "sum" signal and an "overflow" signal; and a clamping unit for performing a clamping process on the "sum" signal in response to the "overflow" signal, and outputting the M-bits pixel data;

wherein the value N is greater than the value M.

* * * * *